(12) United States Patent
Anderson

(10) Patent No.: US 7,182,042 B1
(45) Date of Patent: Feb. 27, 2007

(54) SUPPORT POLE WITH PIPE-HINGE SLIDE LOCK

(76) Inventor: Charles H. Anderson, 8 Old Wakefield Rd., Rochester, NH (US) 03868

( * ) Notice: Subject to any disclaimer, the term of this patent is extended or adjusted under 35 U.S.C. 154(b) by 77 days.

(21) Appl. No.: 10/928,031

(22) Filed: Aug. 27, 2004

Related U.S. Application Data

(60) Provisional application No. 60/498,057, filed on Aug. 27, 2003.

(51) Int. Cl.
*A01K 31/00* (2006.01)
*A01K 39/00* (2006.01)
*E05D 11/10* (2006.01)

(52) U.S. Cl. .................. 119/432; 119/51.01; 16/319

(58) Field of Classification Search .................. 16/319, 16/333; 47/25, 39, 47, 67; 116/173; 119/52.2, 119/57.8, 61.57, 428, 432; 403/102; 135/20.3
See application file for complete search history.

(56) References Cited

U.S. PATENT DOCUMENTS

| | | | | |
|---|---|---|---|---|
| 57,656 A * | 9/1866 | Alden | .................. | 403/93 |
| 2,577,811 A * | 12/1951 | Rutledge | .................. | 403/102 |
| 2,895,757 A * | 7/1959 | Kaspar | .................. | 403/100 |
| 3,696,792 A * | 10/1972 | Bruhns | .................. | 119/432 |
| 3,744,503 A * | 7/1973 | Wolff et al. | .................. | 135/20.3 |
| 3,792,680 A * | 2/1974 | Allen | .................. | 116/173 |
| 3,850,186 A * | 11/1974 | Weber et al. | .................. | 135/20.3 |
| 4,819,584 A * | 4/1989 | Rozumek | .................. | 119/51.01 |
| 5,086,797 A * | 2/1992 | Earnshaw et al. | .................. | 135/20.1 |
| 5,524,505 A * | 6/1996 | Lawrence | .................. | 74/544 |
| 5,572,836 A * | 11/1996 | Parker | .................. | 52/116 |
| 5,974,731 A * | 11/1999 | Wesolowski | .................. | 47/48.5 |
| 6,164,803 A * | 12/2000 | Reniger et al. | .................. | 362/477 |
| 6,439,158 B1 * | 8/2002 | Blohm | .................. | 119/57.8 |
| 6,647,920 B2 * | 11/2003 | Lovett | .................. | 119/52.2 |
| 2003/0136346 A1 * | 7/2003 | Lovett | .................. | 119/52.2 |
| 2004/0177871 A1 * | 9/2004 | Harbaugh | .................. | 135/20.1 |

OTHER PUBLICATIONS

The Backyard Bird Company, *15' Telescoping Purple Martin House Pole* (visited Oct. 25, 2004) <http://www.backyardbird.com/15telpurmarh.html>.

(Continued)

*Primary Examiner*—Francis T. Palo
(74) *Attorney, Agent, or Firm*—McLane, Graf, Raulerson & Middleton, P.A.

(57) ABSTRACT

A self-latching hinge mechanism (14) and apparatus (10) for applications where access to a pole mounted device is required. The hinge comprises a top section (28) with a cantilevered tail piece (38) which extends beyond a pivot (36) connected at the top (40) of a lower section (30). A latch consists of an encircling slide (32) which binds the tail piece (38) to the lower part of the pivot section (30) when in the lowered, locked position and allows the top section piece (28) to rotate relative to the lower section (30).

16 Claims, 7 Drawing Sheets

OTHER PUBLICATIONS

The Backyard Bird Company, *Purple Martin House Pole & Winch System* (visited Oct. 25, 2004) <http://www.backyardbird.com/lspole.html>.

Shop Carolina, Inc., *Order Kfeeder Hanging Pole and Baffle From Shop-NC.com* (visited Oct. 25, 2004) <http://www.shop-nc.com/db/order2.asp?ID=156>.

S&K Manufacturing, Inc., *S&K Manufacturing, Inc. "Home of the Best Purple Martin Bird House": Poles* (visited Oct. 25, 2004) <http://www.sk-mfg.com/Merchant2/merchant.mv?Screen=PROD&Store_Code=SMIOTBPBH&Product_Code=QP24F&Category_Code=P>.

S&K Manufacturing, Inc., *S&K Manufacturing, Inc. "Home of the Best Purple Martin Bird House": Quad-Tel Aluminum Pole* (visited Oct. 25, 2004) <http://www.sk-mfg.com/Merchant2/merchant.mv?Screen=PROD&Store_Code=SMIOTBPBH&Product_Code=TTP-15-4&Category_Code=P>.

S&K Manufacturing, Inc., *S&K Manufacturing, Inc. "Home of the Best Purple Martin Bird House": Quad-Tel Pole 24 Family* (visited Oct. 25, 2004) <http://www.sk-mfg.com/Merchant2/merchant.mv?Screen=PROD&Store_Code=SMIOTBPBH&Product_Code=QP24F&Category_Code=P>.

\* cited by examiner

SUPPORT POLE WITH PIPE-HINGE SLIDE LOCK

CROSS-REFERENCE TO RELATED APPLICATION

This application claims the benefit under 35 U.S.C. § 119(e) of U.S. provisional application Ser. No. 60/498,057 filed Aug. 27, 2003. The aforementioned provisional application is incorporated by reference in its entirety.

FIELD OF THE INVENTION

The present invention relates generally to a hinge and more particularly, a self-latching pipe hinge mechanism. The present invention will be described herein primarily by way of reference to devices which may be used to support hanging bird feeders, hanging plants, or the like, where the load must be supported at some distance from the ground for security or visibility while retaining accessibility for replenishment or maintenance and will be described herein primarily in reference thereto. However, it will be recognized that the present invention may be employed in connection with all manner of support structures for hanging or suspending objects above a surface. Other uses include but are not limited to flag poles, volleyball, basketball, or other net supports or poles, utility or decorative light poles, awnings, umbrellas, sun shades, outriggers, and the like.

BACKGROUND OF THE INVENTION

There are numerous ways to mount a bird feeder. There seem to be two prevalent pole-based solutions. The feeder-on-top where the feeding device is mounted at the top of a fixed pole and the hanging feeder where the feeder is suspended from a bracket or the top of an offset section that loops vertically around the feeder to maintain the center of gravity of the feeder over the base of the pole. The lower end of both of these is either embedded in the ground or fastened to a building or some sort of base. These and most of the other existing pole based solutions and accessories seem to adequately address the issues of security and visibility. Security and visibility, up to some degree, improve as a function of height. Accessibility varies inversely with height. Stepladders are necessary for refilling higher pole mounted bird feeders with the exception of the types that separate in the middle so that the top section can be lifted out of the bottom section allowing the feeder to be lowered for replenishment. This arrangement severely limits the size and weight of the feeder that can deployed in many cases and therefore shortens the time between necessary refills. Older or more frail individuals might have difficulty lifting or not be able to lift some of the larger, longer lasting feeders into place when full and therefore might have to refill more often or forego refilling entirely in cold or inclement weather.

Accordingly, the present invention contemplates a new and improved pipe hinge, and bird feeder apparatus and method incorporating the same, which overcome the above-referenced problems and others.

SUMMARY OF THE INVENTION

The tilting/tipping bird feeder pole incorporating the pipe-hinge slide lock technology provides the possibility for many individuals who might otherwise be severely limited, to potentially utilize larger heavier feeders that accommodate more birds and hold more food, providing longer periods between refills. The tilt-pole/pipe-hinge in accordance with the present invention is preferably a heavy duty assembly fabricated from steel pipe instead of lighter tubing as are most other types of bird feeder poles. In a preferred aspect, the pole is designed to be shipped in three sections and easily assembled in the field with readily available tools. The three sections consist of a top section bent to form a vertical loop around the bird feeder so that the feeder hangs directly above the base of the pole for balance, a center section which is the pipe-hinge and slide lock, and a bottom or base section, preferably made from a larger diameter pipe for additional strength. In an especially preferred embodiment, the base section is terminated at the bottom with a pointed plug designed to make driving the base pipe into the ground easier and more importantly to force the displaced earth to compact around the base section instead of filling the pipe thus making the surrounding earth firmer and the base section more stable in the ground.

The operation of the pole is intended to be easy even in the case where the operator might be small or frail or the bird feeder might be large and heavy. Such an operator might be able to lift the slide latch with one hand and lower the pole and empty feeder with the other to the point where the slide latch is captive above the pivot point and then lower the pole and feeder to the ground with both hands. Such an operator might then, after filling the feeder, be able to raise the feeder to the upright position with both hands and the full pushing strength of the body without the need to manually operate the gravity activated slide latch. The tailpiece of the upper hinge section keeps the operator from possibly encountering a situation wherein because of the mass of the upper pole section and the full feeder, the pole top might tend to pass the vertical and continue back to the down position on the other side before the slide latch can drop into the down or locked position. Still further benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings, wherein like reference numerals refer to like or analogous components throughout the several views, are only for purposes of illustrating preferred embodiments and are not to be construed as limiting the invention.

DETAILED DESCRIPTION OF THE PREFERRED EMBODIMENT

Figure 1:
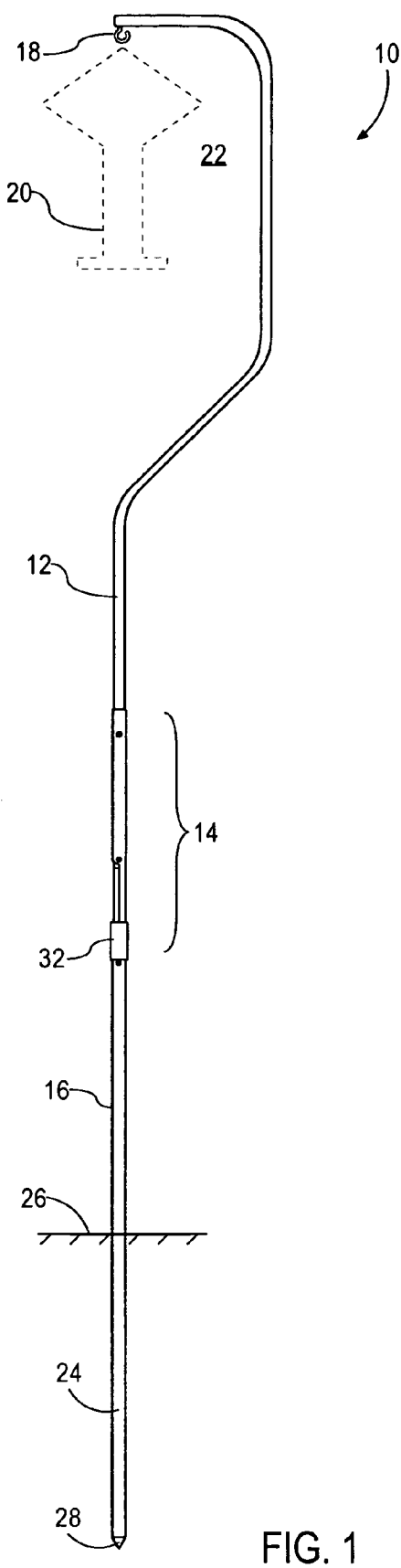
FIG. 1 is a side view of the bird feeder application of the pipe-hinge slide lock in the upright or locked position.
Figure 2:
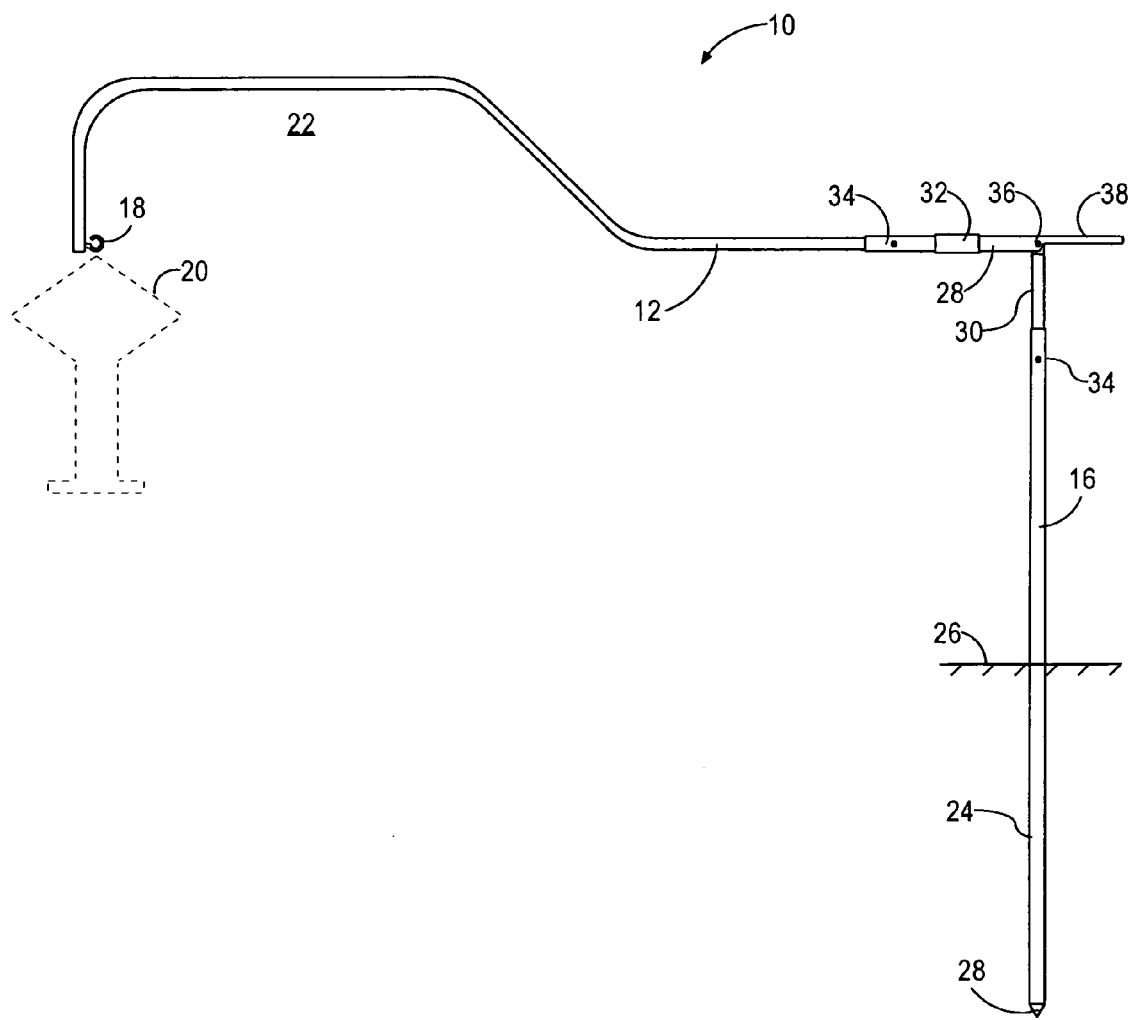
FIG. 2 is a side view of the bird feeder application of the pipe-hinge slide lock in the unlocked rotated or down position.
Figure 3:
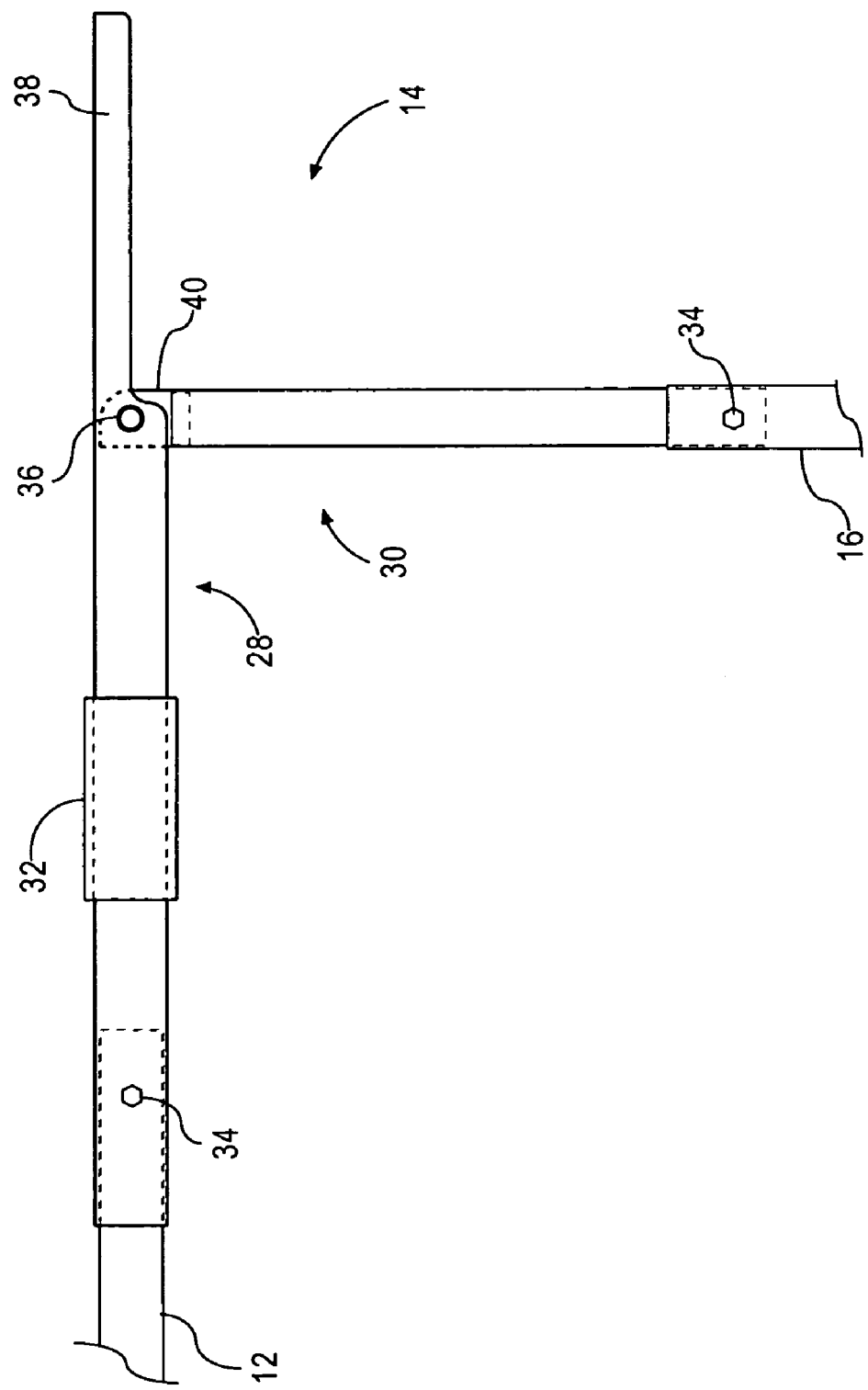
FIG. 3 is a detail view of the pipe-hinge slide lock assembly.

Referring now to the FIGS. 1–3, an exemplary embodiment of a bird feeder pole/plant hanger pole apparatus 10 embodying the pipe-hinge slide lock of the present invention consists of three sections, namely, a top section 12, a middle section 14, and a base section 16. The top section 12, in the depicted embodiment, may be fabricated from steel pipe and is fitted at the end of the upper extremity with a hook 18 for supporting a hanging bird feeder 20 or other object to be suspended, such as planter or the like. The hook 18 is preferably fabricated from steel although other materials are contemplated.

The top section 12 is bent in such a fashion as to provide a clearance or opening 22 for receiving the bird feeder 20 (for the sake of brevity, the item to be suspended will be described herein primarily by way of reference to the preferred embodiment wherein the hanging item is a bird feeder; however it will be recognized that this discussion is equally applicable to any other item to be suspended). This clearance or opening 22 preferably suspends the bird feeder 20 in a position which is generally centered over the lower and middle sections 14 and 16 to afford balance and support.

In the depicted embodiment, the device 10, distal end 24 of the bottom pole section 16 may be driven into the ground 26 or other surface, although other means for securing or anchoring the base section 16 to the surface 26 are contemplated. The bottom portion 16 is preferably fabricated from a larger diameter steel pipe for additional strength and to displace a larger volume of earth when driven into the ground 26. In this preferred embodiment, additional stability may be provided from compaction of the earth 26 surrounding the embedded portion of the base section 16.

Figure 8:
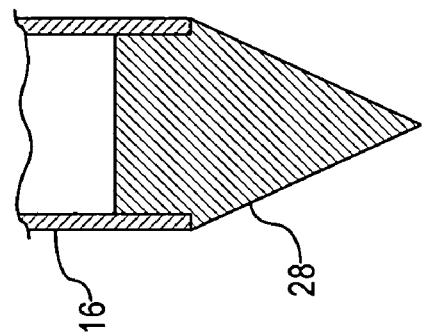
FIG. 8 is a fragmentary cross-sectional view of an embodiment employing pointed plug to facilitate embedding the lower end of the pole device in the ground.

The base section 16 is open at the top to receive the bottom section of the pipe-hinge slide lock assembly and, in the depicted embodiment, is terminated at the distal end 24 with a pointed, e.g., conical, plug 26. As best seen in FIG. 8, the pointed plug 26 is designed to make driving the base pipe into the ground easier and to force the displaced earth to compact around the base section, instead of filling the distal pipe end 24 with earth, thus making the surrounding earth firmer and the base section more stable in the ground 26. It will be recognized that other methods of embedding or securing the base section to the ground, floor, or other surface are also contemplated.

The middle section, or pipe-hinge slide lock assembly, 14 is best seen in FIG. 3, and consists of three main pieces, namely, a hinge top or cantilever section 28, a hinge bottom portion 30, and a sliding latch or sleeve 32. The hinge top section may be fabricated, for example, from steel pipe and, in the depicted embodiment, is adapted to receive the top section 12 telescopically therewithin. The hinge top section 28 may be of the same diameter as pole bottom or base section 16. The hinge top section 28 and the top section 12 may be secured in fixed telescoping relation via a bolt or retention pin 34, e.g., passing through aligned holes formed in the respective members 12 and 28.

As described above, the middle section top portion 28 is open at the top to receive the bottom end of the smaller diameter pole top section 12. Approximately centrally located along the length of the hinge top section 28 is a hinge or pivot pin 36, which is preferably welded or otherwise permanently secured in place. The pin 36 engages an opening in the top portion of the hinge bottom section 30. An optional bearing may be provided as described in detail below. Thus, in operation, the top portion 28 forms the movable part of a rotating pivot point about the hinge/pin 36.

The hinge top section 28 further includes a cantilevered tail section 38 extends past the pivot pin or hinge point 36. The cantilevered tail section 38 is preferably integrally formed with the hinge top section 28 and, in the depicted embodiment, is formed by removing approximately one-half of the circumference of the pipe material forming the hinge top section 28 that extends beyond the pivot point 36. Thus, in the depicted embodiment, the tail section 38 is approximately semicircular in cross-sectional shape. The hinge bottom section 30 is preferably slightly smaller in diameter than the hinge top section 28 so as to enable the hinge bottom section to fit within the tail section 38 when the hinge top portion 28 is moved into the upright position (see FIG. 1). For example, the outer diameter of the bottom hinge section 30 may be roughly equal to the inner diameter of the hinge top section 28. The hinge bottom portion 30 and the top pole section 12 may be of the same diameter. Likewise, the hinge top section 28 and the bottom pole section 16 may be of the same diameter. A portion of the hinge bottom portion 30 thus fits within and against the inward facing portion of the tail piece 38 when the hinge top and bottom portion members are coaxially aligned, i.e., when the hinge is in its upright position.

The pipe hinge portion 14 is held in an upright position by the annular slide latch piece 32 which is adapted to circumscribe the top pipe hinge section 28 when the pole is in the tilted or down position and is slidably moved in the axial direction to secure the tail section 38 against the hinge bottom section when the pole 10 is in the upright operational position. In this manner, the slide lock piece 32 keeps the hinge top section 28, and thus the pole top section 12, coaxially aligned with the hinge bottom section 30 and the pole bottom or base section 16. The hinge bottom section 30 may be fabricated from steel pipe and may be the same diameter as the pole top section 12 to allow it to fit the inside diameter of the hinge top section 28 and to be received into the upper end of the pole bottom or base section 16. In the depicted embodiment, the hinge bottom section 30 and the base section 16 are secured in fixed telescoping relation via a bolt or retention pin 34, e.g., passing through aligned holes formed in the respective members 16 and 30. In the depicted embodiment, the upper end 40 of the hinge bottom section 30 is rounded or angled to provide clearance for the inner circumference of the hinge top section 28 as the pivot joint rotates.

Figure 7:
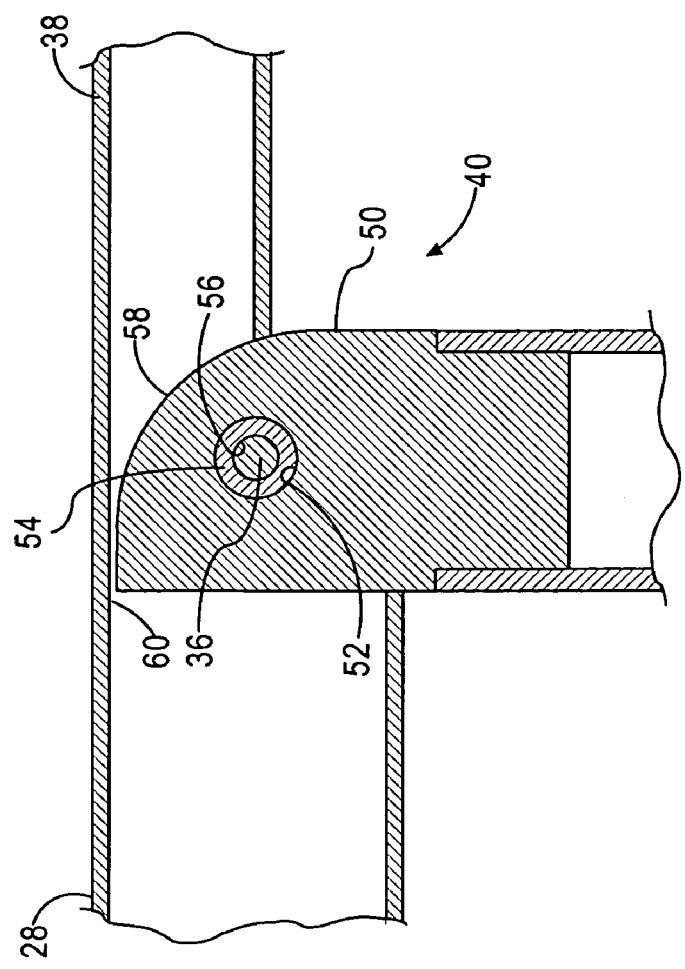
FIG. 7 is a fragmentary cross-sectional view of a preferred pivot joint employing a solid plug and pivot bushing.

The hinge or pivot pin 36 may be provided via a number of means. For example, in a embodiment illustrated in FIG. 7, the top end 40 of the hinge bottom section 30 may be fitted with a plug 50, such as a steel plug which is drilled to accept the pivot pin 36 from the hinge top section 28 through a transversely extending opening 52. Preferably the opening 52 is sized to accept a bearing 54, e.g., formed of bronze or other metal or metal alloy. The bearing 54 includes a through bore 56 receiving the pin 36 therethrough, e.g., for wear improvement and/or to keep rust from immobilizing the pivot point. The plug in the top end 40 of the hinge bottom section 30 is machined to a rounded and/or angled profile 58 so as to provide clearance for the inner circumference 60 of the hinge top section 28 as the pivot joint rotates. The bottom of the hinge bottom section 30 is received into the top of the pole bottom or base section 12 as described above.

The sliding latch member 32 consists of a peripheral sleeve, such as a short section of pipe, such as steel pipe. The sliding latch 32 has an inside diameter which is larger than the outside diameter of the hinge top section 28 (and the pole bottom or base section 16 when like sized pipe is used in accordance with the depicted embodiment) such that it can slide freely along the length of the pipe-hinge 14 in order to lock or unlock the assembly. The slide piece movement is restricted by a protrusion or stop at each end of the pipe hinge slide lock assembly 14, which may advantageously be the retaining pins, or more preferably bolts 34 or the like that are used to secure the top pole section 12 to the hinge top section 28 and the bottom pole section 16 to the bottom hinge section 30. In the depicted preferred embodiment, the bolts or pins 34 serve to fasten the ends of the pipe-hinge slide lock assembly 14 to the respective pole top section 12 and pole bottom section 16, although separate dedicated stop members are also contemplated.

In operation, when the slide 32 is lifted and the two sections 28 and 30 move away from coaxial alignment, it is no longer possible for the slide 32 to return to the locked position until the two sections 28 and 30 are coaxially re-aligned, e.g., by lifting the top pole section 12 to the upright position. This feature allows the possibility that an operator having once lifted the latch to lower a pole connected to the pipe-hinge mechanism might then be afforded the use of both hands to raise the pole again. In the preferred, vertical application depicted, the slide 32 automatically moves to the locked position by the force of gravity when the two hinge sections achieve coaxial alignment. This embodiment may be adapted for use in a non-vertical application by employing a spring attached to the sleeve 32 which biases the sleeve toward the locked position. To unlock the hinge, the sleeve 32 is moved against the bias of the spring and the top hinge section is moved out of axial alignment with the bottom hinge section 30. When the top hinge section 28 is moved back into axial alignment with the bottom hinge section 30, the spring urges the sleeve back to the locked position. In the preferred embodiment, the pole sections 12 and 16 and the hinge sections 28 and 30 are formed from round pipe, preferably steel or other metal or metal alloy. However, the device could be fabricated from a number of different materials exhibiting a diversity of cross-sectional shapes, including rectangular, polygonal, or other geometric cross-sectional shapes.

Figure 4:
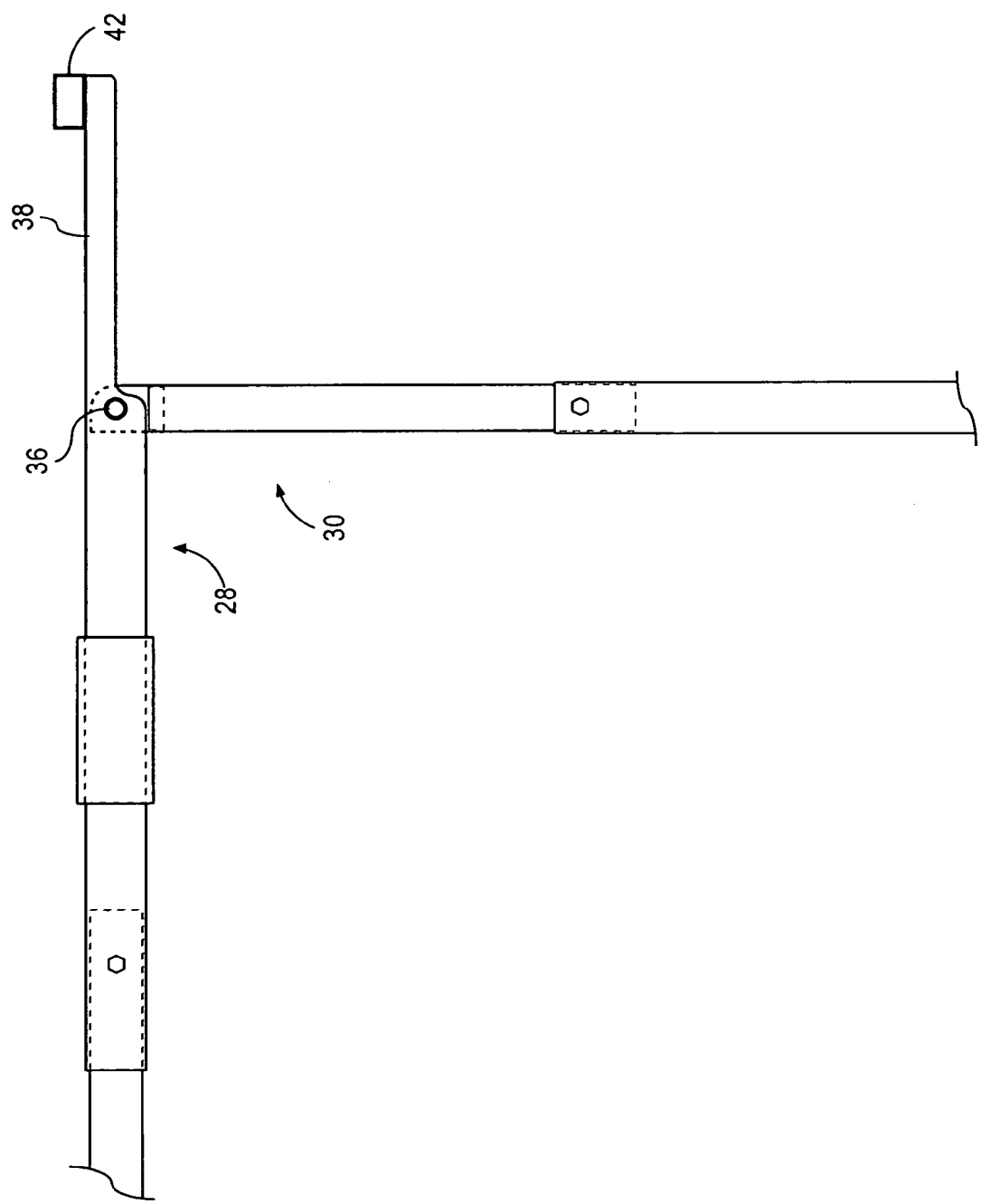
FIGS. 4–6 are fragmentary views of a device according to the present invention illustrating optional means for assisting a user in raising the pole to the upright position.

With reference now to FIG. 4, an alternative embodiment is shown having an optional counterweight or counterbalance 42, provided on the tail section 38 to further assist a user in moving the upper section between the lowered and upright positions. In the depicted embodiment, the counterweight 42 is shown somewhat schematically and may take any desired geometric configuration. Also, in the depicted embodiment, the counterweight 42 is shown attached directly to the tailpiece 38. Alternatively, however, a boom or extension (not shown) may be provided to increase the distance between the counterweight 42 and the pivot point 36. Likewise, the counterweight 42 and/or the distance between the counterweight 42 and the pivot point 36 may be made variable.

Figure 5:
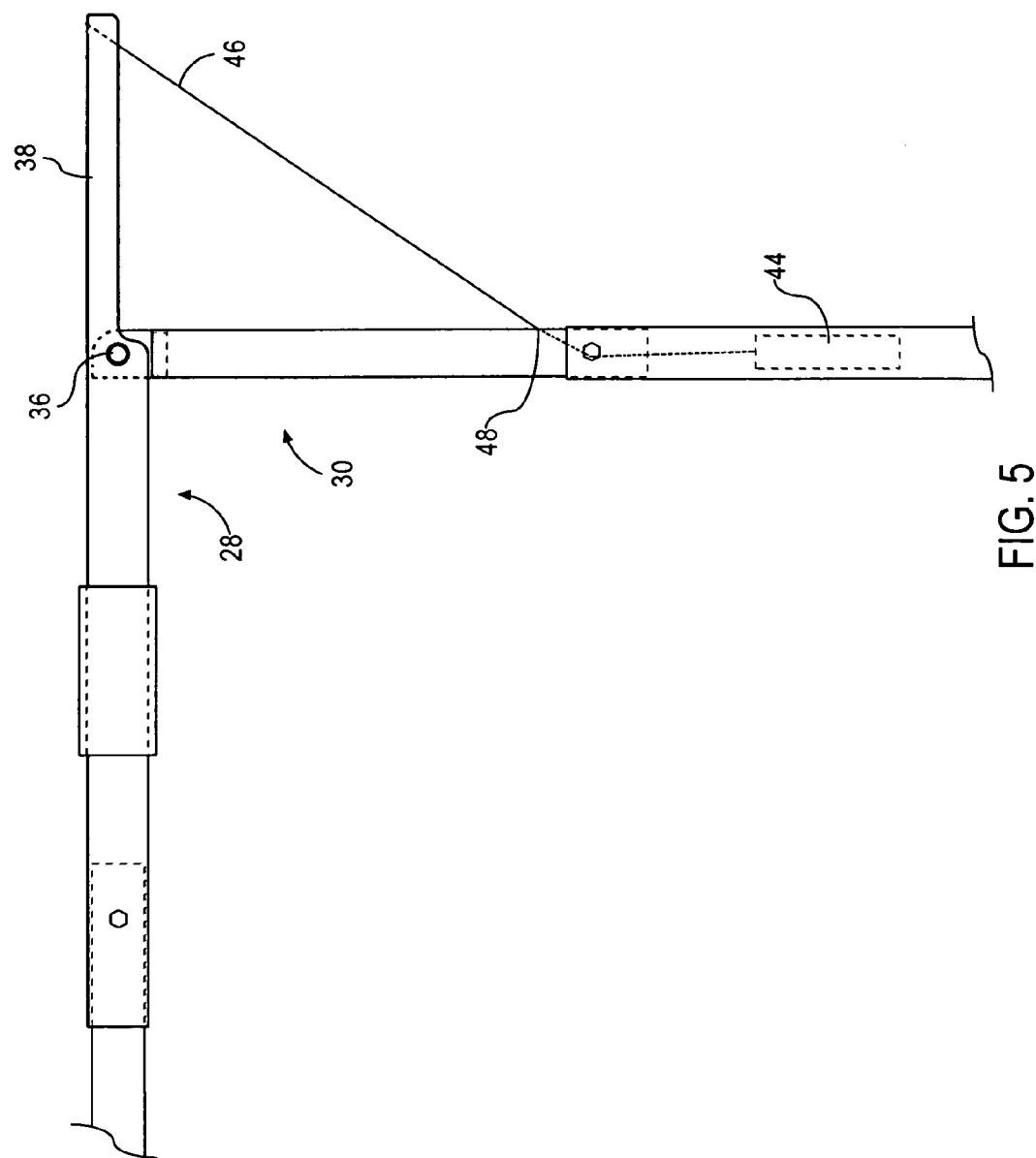
Figure 6:
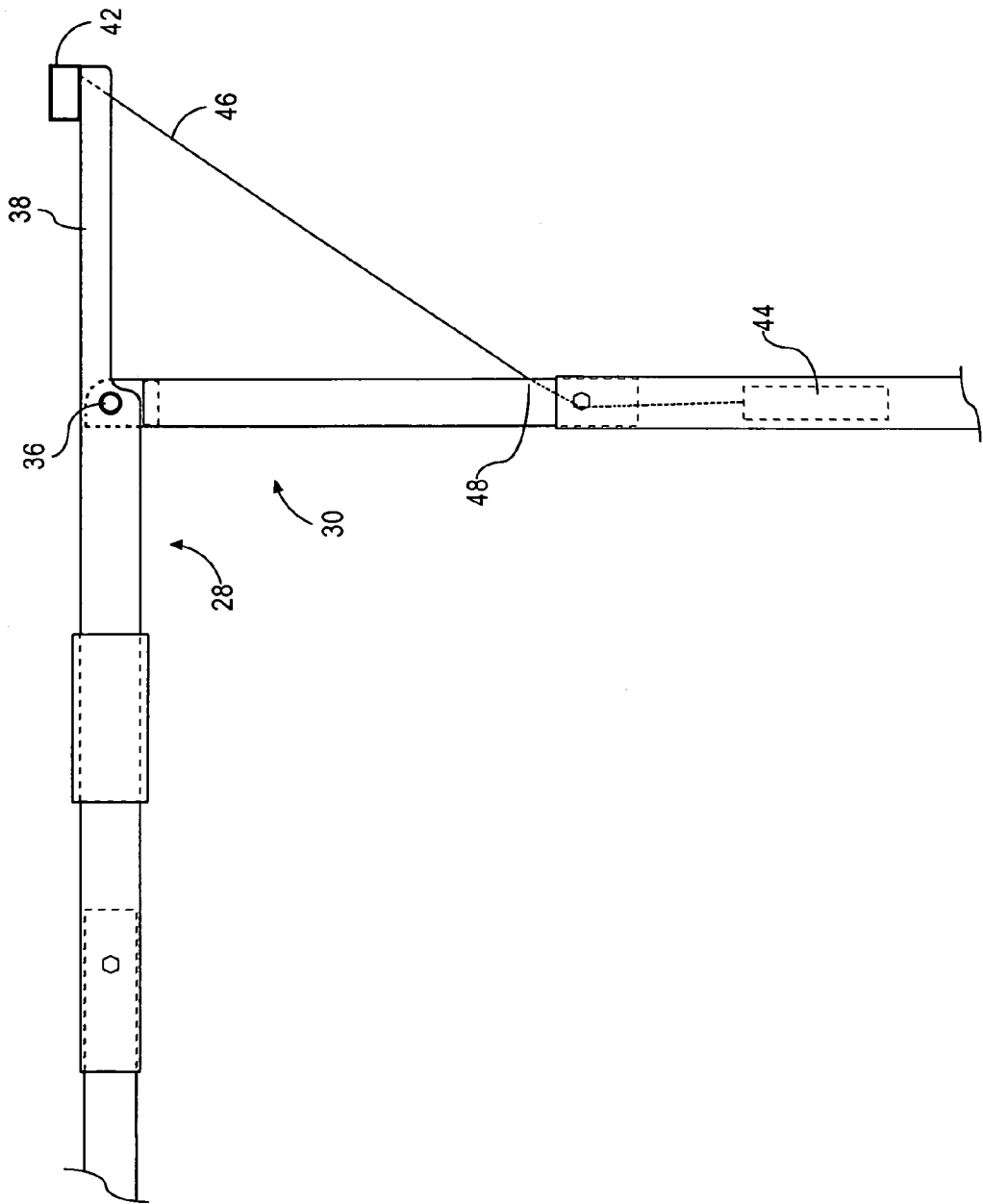

Alternatively, as shown in FIG. 5, or in addition to the counterweight 42 as shown in FIG. 6, a counterweight or other energy storage device 44 could be provided within the base pole section 16 and coupled to a movable portion of the device, preferably the tail piece 38, via a cable or other mechanical linkage 46. In the depicted embodiment, the cable 46 cable is illustrated passing through an opening 48 in the lower hinge section 30. In operation, as the top pole portion 12 is pivoted and lowered to a tilted position, potential energy is stored by the energy storage device 44 to assist the user when returning the pole to the upright position.

For example, in the case of a counterweight 44, energy is stored as the weight is lifted to a higher position. Alternatively, the energy storage device 44 may be a spring, such as a helical spring, preferably contained within the tubular portion 16 and coupled to a movable portion of the unit 10. For example, by securing the cable/coupler 46 to a first end of the spring and securing the opposite end within the pole base 16, energy may be stored as increased spring tension when the top section 12 is pivoted to a lowered position. This increased spring tension serves to bias the pole section 12 back toward the upright position, thereby storing energy to assist the user in returning the pole to its upright position. Other devices are contemplated for use as the optional energy storage device 44 for assisting the user in returning the upper pole section 12 to its upright position, such as an air piston and cylinder assembly, or the like.

Also, combinations of such energy storage devices may be employed. For example, in FIG. 6, an external counterweight 42 as described above is employed in conjunction with an internally mounted energy storage device 44 as described above.

The invention has been described with reference to the preferred embodiment. Modifications and alterations will occur to others upon a reading and understanding of the preceding detailed description. For example, the middle hinge section 14 need not be separable from the top and bottom pole sections 12 and 16, respectively. Thus, one or both of the upper hinge section 28 and lower hinge section 30 may be integrally formed with the respective top and base pole section 12 and 16. In one embodiment, the pole top section 12 is integrally formed with hinge cantilever section 28, and the pole base section 16 is separately attachable to lower hinge pivot section 30. In another alternative embodiment, the pole top section 12 is separately attachable to the hinge cantilever section 28, and the pole base section 16 is integrally formed with the lower pipe hinge pivot section 30. In yet another alternative embodiment, the pole top section 12 is integrally formed with the hinge cantilever section 28, and the pole base section 16 is integrally formed with the lower hinge section 30. Also, it will be recognized that the cantilever and pivot sections 28 and 30 may be reversed from the depicted preferred embodiment such that the cantilever hinge section 28 is retained within or integrally formed with the base pole portion 16 and the lower hinge pivot section 30 engages or is integrally formed with the pole top section 12. Also, the depicted preferred embodiment illustrates the various sections fastened in affixed telescopic relation using a bolt or pin passing through aligned holes. However, other fastener types may also be employed, such as complimentary threaded section ends, mating flanges, clamping rings, and the like. It is intended that the invention be construed as including these and other modifications and alterations insofar as they come within the scope of the appended claims or the equivalents thereof.

Having thus described the preferred embodiments, the invention is now claimed to be:

1. A hinge device, comprising:
   first and second elongate hinge members;
   said first hinge member having a stem portion and a tail portion;
   said second hinge member having a first end pivotally attached to the first hinge member at a pivot point located between the stem portion and tail portion of the first hinge member to enable pivoting movement of the hinge device between an extended position and an articulated position;

said first and second hinge members being in aligned coaxial relation and said tail portion engaging said second hinge member portion when the first and second hinge members are in said extended position; and an annular sleeve circumscribing said stem portion of said first hinge member when said first and second members are in the articulated position, the annular sleeve being freely slidably movable from said stem portion past said pivot point to said tail portion to secure said tail portion to said second hinge member when the first and second hinge members are in said extended position.

2. The device of claim 1, further comprising:

an elongate base portion having a first end attached to a second end of said second hinge member and a second end adapted to engage a surface; and a support arm having a first end attached to the stem portion of the first hinge member and a second end opposite the first end adapted to be attached to an object.

3. The device of claim 2, further comprising:

a hook attached to the second end of the support arm for suspending an object above said surface.

4. The device of claim 2, wherein at least a portion of said support arm is curved such that the object will be suspended substantially in line with a longitudinal axis of said base portion when the object is attached to the second end of the support arm and the first and second hinge members are in said extended position.

5. The device of claim 2, further wherein:

the second end of the second hinge member is telescopically received within the first end of the base portion and further comprising a first fastener securing the second end of the second hinge member to the first end of the base portion; and the first end of the support arm is telescopically received within the stem portion of the first hinge member and further comprising a second fastener securing the first end of the support arm to said stem portion.

6. The device of claim 5, wherein one or both of said fasteners includes a protruding portion which protrudes outwardly from an exterior facing surface of the base portion and engages with said annular sleeve when the first and second hinge members are in said extended position to limit the extent of axial movement of said sleeve.

7. The device of claim 1, wherein said tail section has a curved cross-sectional profile which is complimentary and mating with an aligned, facing surface of said second hinge member when the first and second hinge members are in said extended position.

8. The device of claim 1, further comprising an energy storage device for storing potential energy when said first and second hinge members are moved from the extended position to an articulated position, said stored potential energy for assisting a user in moving the first and second hinge members from the articulated position back to the extended position.

9. The device of claim 8, wherein the energy storage device is selected from one or more counterweight, one or more springs, one or more piston and cylinder assemblies, or combinations thereof.

10. The device of claim 9, wherein said energy storage device is selected from one or both of:

an energy storage device externally mounted on the device; and an energy storage device received within a hollow portion of said device.

11. The device of claim 2, further comprising means for storing potential energy when said first and second hinge members are moved from the extended position to an articulated position.

12. The device of claim 2, wherein said base portion, said first and second hinge members, and said support arm are formed of a tubular material having a circular cross-sectional shape.

13. The device of claim 12, wherein said pipe tubular material is steel pipe.

14. The device of claim 13, wherein the support arm and the second hinge member have a first inner diameter and a first outer diameter and the base portion and the first hinge member have a second inner diameter and a second outer diameter, and further wherein the first outer diameter is less than or equal to the second inner diameter.

15. The device of claim 1, wherein the first end of the second hinge member has a rounded and/or angled elevational profile adapted to accommodate pivoting of the first hinge portion relative to the second hinge portion.

16. The device of claim 3, wherein said object is a bird feeder.

* * * * *